(12) United States Patent
Baechtle et al.

(10) Patent No.: US 8,231,442 B2
(45) Date of Patent: Jul. 31, 2012

(54) DEVICE AND METHOD FOR PARTING SAUSAGE CHAINS

(75) Inventors: Manfred Baechtle, Schemmerhofen (DE); Juergen Flach, Obermarchtal (DE); Klaus Schmid, Riedlingen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 13/043,516

(22) Filed: Mar. 9, 2011

(65) Prior Publication Data
US 2011/0223846 A1 Sep. 15, 2011

(30) Foreign Application Priority Data
Mar. 12, 2010 (DE) .......................... 10 2010 002 827

(51) Int. Cl.
*A22C 11/00* (2006.01)
(52) U.S. Cl. ........................................................ 452/49
(58) Field of Classification Search .............. 452/30–32, 452/35–37, 46–48, 51
See application file for complete search history.

(56) References Cited

U.S. PATENT DOCUMENTS

| | | | |
|---|---|---|---|
| 4,104,763 A | 8/1978 | Tetsuro | |
| 5,147,239 A * | 9/1992 | Staudenrausch | 452/47 |
| 6,080,054 A * | 6/2000 | Muller et al. | 452/49 |
| 7,381,123 B2 * | 6/2008 | Bachtle | 452/46 |
| 7,553,222 B2 * | 6/2009 | Jackel | 452/38 |
| 2009/0075577 A1 | 3/2009 | Stimpfl | |

FOREIGN PATENT DOCUMENTS

| | | |
|---|---|---|
| DE | 4028343 A1 | 3/1992 |
| DE | 4307637 A1 | 12/1993 |
| DE | 19802101 C1 | 8/1999 |
| DE | 102004056038 A1 | 5/2006 |
| DE | 102009033725 A1 | 3/2011 |
| EP | 0931458 A1 | 7/1999 |

OTHER PUBLICATIONS

German Search Report for DE 102010002827.4, dated Jun. 9, 2010.

* cited by examiner

*Primary Examiner* — Richard Price, Jr.
(74) *Attorney, Agent, or Firm* — Marshall, Gerstein & Borun LLP

(57) ABSTRACT

A method and a device for separating a sausage chain into single sausages, where filled, portioned sausages are initially transported with a first transport device and with a second transport device arranged behind the first transport device in the transport direction T. The portioning point between two consecutively arranged sausages is enlarged due to the transport speed of the second transport device being faster at least intermittently than the transport speed of the first transport device. The sausage chain is then parted at the portioning point in the second transport device.

15 Claims, 3 Drawing Sheets

DEVICE AND METHOD FOR PARTING SAUSAGE CHAINS

CROSS-REFERENCE TO RELATED APPLICATION

The present application claims the benefit of priority of German Application No. 102010002827.4, filed Mar. 12, 2010. The entire text of the priority application is incorporated herein by reference in its entirety.

FIELD OF THE DISCLOSURE

The disclosure relates to a method and a device for separating single sausages from chains of same.

BACKGROUND

Various methods are used for separating sausage chains into single sausages.

DE 4 307 637 has already described the partitioning of the sausage chain between two transport devices. A disadvantage with this method is the parting between the transport devices. Due to the lateral force occurring during parting at the parting point of the sausage it may be deflected to the side, i.e. it can collide with an edge of the second transport device and become damaged. It is also possible that the complete sausage skein becomes jammed and the machine has to be stopped to remedy the fault. Furthermore, it is very difficult to part very short sausage products, because they have to be parted without being held cleanly by the second transport device.

In DE 19802101 a method of parting sausage chains is described in which only one transport device is used. The portioning point is produced by the transport device. The sausages however lie close together. Primarily during the manufacture of products with natural casing it is very difficult to produce a suitable gap between the sausages so that the sausages can be properly parted at the gap. Producing the gap is only successful when the skin brake is firmly applied, which in turn causes high stress on the casing. This can lead to bursting of the casing and thus to faults.

SUMMARY OF THE DISCLOSURE

Based on this, one aspect of the disclosure is to provide a device and a method with which chains of sausages can be divided into single sausages in a reliable and simple manner without faults occurring when parting at the portioning point and without the casing bursting.

According to the disclosure the portioning point between two consecutively arranged sausages can be enlarged in that the transport speed of the second transport device is faster at least intermittently than the transport speed of the first transport device. Due to the enlargement of the portioning point, i.e. the production of a larger gap between two consecutively arranged sausages, the sausages can be parted from one another more easily with the aid of an appropriate parting device. An advantage with this method is that the gap for parting is not produced by intensive braking, i.e. by holding back the sausage casing in the skin brake and so less bursting of the casing occurs. The skin brake must therefore be adjusted less firmly. Due to the fact that the portioning point is parted in the second transport device there is the advantage that during the parting process the sausages can be held firm by the second transport device so that the lateral force arising during parting does not deflect the sausage to the side. As a result the sausage remains stably located in its track during parting. During parting there are no collision points and clean parting and fault-free working are possible. Even very short sausage products can be reliably parted, because they can be cleanly held by the second conveyor belt. This means that overall the filling speed and therefore the effective throughput can be increased.

According to a preferred embodiment the transport speed of the second transport device is briefly increased and/or the transport speed of the first transport device is briefly reduced when the portioning point is located between the transport devices. The transport speed of the first and/or second transport device is changed until a previously determined desired gap is produced between the sausages. Then the transport devices can again run at their corresponding transport speed until the next portioning point is located between the transport devices. It is however also possible that the second transport device is consistently slightly faster than the first transport device.

According to the disclosure the portioning point here is enlarged such that the spacing of the centre points M1, M2 of consecutively located sausages is 1-8 mm larger than the spacing d1 before the enlargement. This implies that actually a gap between the sausages is produced which permits the sausages to be parted more simply.

According to a preferred embodiment the position of a portioning point before the parting point is determined by means of a sensor. In this way the parting device can be specifically controlled and, in dependence of the sensor signal, can part the portioning point when it passes the parting point. It is however also possible that the system control determines by computerized means when the portioning point is located at the parting point. The controller can determine this based on known parameters, such as the transport speed of the first transport device, transport speed of the second transport device, point in time and location at which the portioning point is produced.

According to a preferred embodiment it is also possible to determine when a portioning point is located between the transport means, whereby then the transport speed of the first and/or the second transport device is appropriately changed. This determination can be carried out either by computerized means by a control unit based on known parameters, such as transport speed of the first transport device, point in time and location at which the twist-off point is produced, or by means of a sensor.

A device for implementing the method has a first and a second transport device as well as a parting device in the second transport device. Furthermore, an appropriate device preferably has a controller which controls the transport devices such that the transport speeds of the first and second transport devices are intermittently different such that the portioning point between two adjacently arranged sausages is increased.

The first and second transport devices each comprise oppositely situated circulating transport means, in particular oppositely situated circulating belts. Thus, the transported sausages can be easily held and transported from above or below and are therefore also protected against displacement and deflection during parting of the portioning point.

Advantageously a sensor for detecting the portioning point is arranged in a region from 50 to 400 mm in front of the parting device. The parting device can then be controlled in dependence of a sensor signal. This is particularly advantageous with a fast filling speed.

The distance between the conveying devices can be designed to be very small and is preferably in a range from 1-5 mm. This is particularly advantageous for the manufacture of very short sausages, because they are adequately supported by both of the transport devices. An appropriately short distance is possible, because no functional element, such as for example a parting knife is situated in this region.

The control device can be designed such that the speed of the second transport device is briefly increased and/or the speed of the first transport device is briefly reduced, particularly when a portioning point is located between the transport devices.

BRIEF DESCRIPTION OF THE DRAWINGS

It is also possible that the control device comprises a control unit which determines when a portioning point is situated between the transport devices. Alternatively, a sensor can also be provided here.

In the following the disclosure is explained in more detail with reference to the following figures.

DETAILED DESCRIPTION OF THE PREFERRED EMBODIMENT

Figure 1:
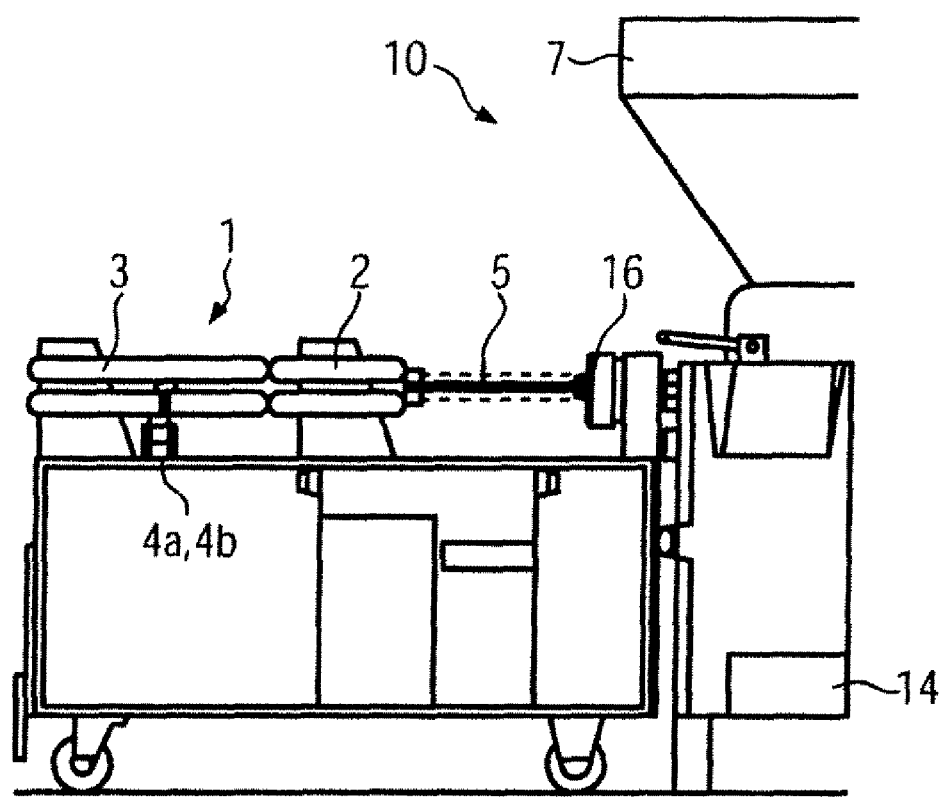
FIG. 1 is a schematic illustration of a sausage tilling machine with a device according to the disclosure for parting a sausage chain.

FIG. 1 schematically shows the overall view of a filling machine 10 which comprises a device for parting a sausage chain 1. The filling machine has a filling hopper 7 for the sausage meat. Reference numeral 5 designates a filling tube through which the sausage meat can be pushed out with the aid of a conveying device, in particular a vane cell pump, into a sausage casing. Reference numeral 6 designates a skin brake by which the sausage casing can be guided and stretched which for example is gathered above the filling tube 5. By ejecting the filling material, i.e. the sausage meat, the sausage casing can be pulled from the filling tube in the transport direction. Reference numeral 16 designates a twist-off gear for the formation of a portioning or twist-off point between individual sausages. This implies that the filling tube 5 together with the skin brake is pivotable around the axis A and a twist-off point can be produced by retention of the sausage using a transport device 2.

Figure 2:
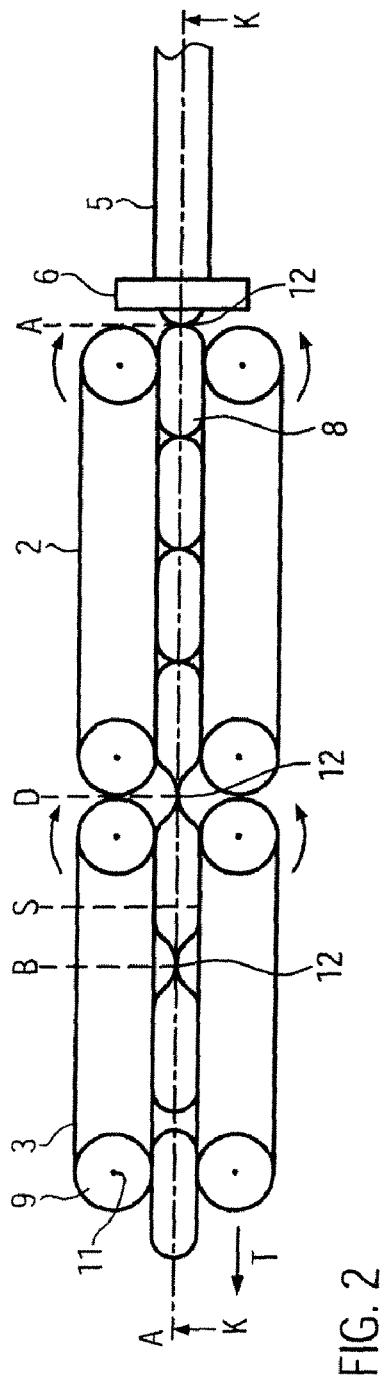
FIG. 2 is a schematic longitudinal section through a device according to the disclosure for parting sausage chains.

As can be derived from FIG. 2, the transport device 2 is formed from oppositely situated transport means, represented here by oppositely situated circulating endless belts or also transport chains with displacement elements. The belts each run around deflection rollers 9, which rotate about corresponding axes 11, whereby the belts are each driven by at least one roller. The spacing of the belts can be set such that sausages with a certain caliber can be held firmly between the belts and transported in the transport direction T. A second transport device 3 is provided in the transport direction behind the first transport device 2. In an advantageous manner the spacing between the transport devices is slight and is preferably in a range from 1 to 5 mm. Thus, short sausages can also be reliably transferred from one transport device to the next. The second transport device 3 is formed corresponding to the first transport device, whereby however the second transport device has a further parting device 4a, b for parting consecutively arranged sausages at the portioning point 12. In FIG. 2 the parting device 4a, b is not illustrated. Advantageously, the transport devices 2, 3 have separate drive rotors, which are not illustrated, and can be controlled separately from one another.

Figure 4:
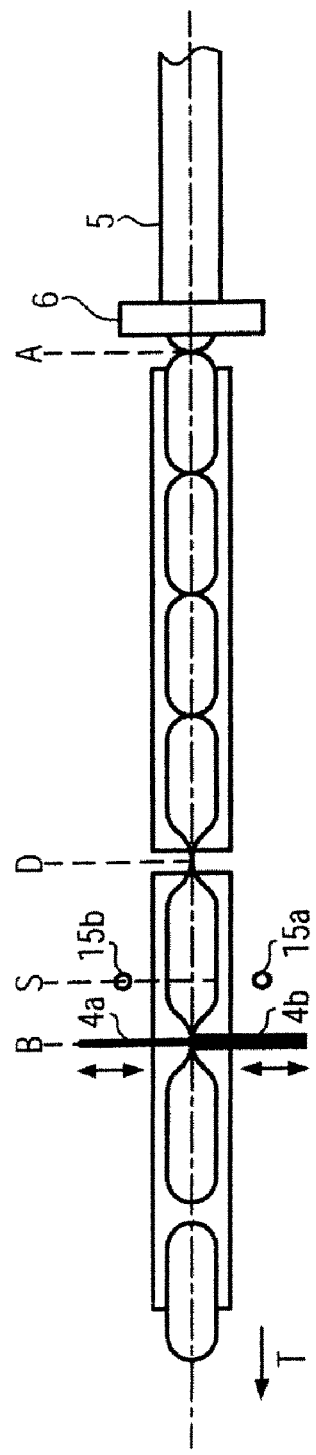
FIG. 4 is a section along the line K-K in FIG. 2.

As can be seen in particular from FIG. 4, an appropriate parting device 4a, b can comprise two parting elements 4a, b, located at the side between oppositely situated belts, as indicated by the arrows in FIG. 4, and which can be moved towards one another and can part the sausages 8 at their portioning point 12. The parting elements 4a, b can have two blades or one blade 4a and an opposing piece 4b.

Figure 5:
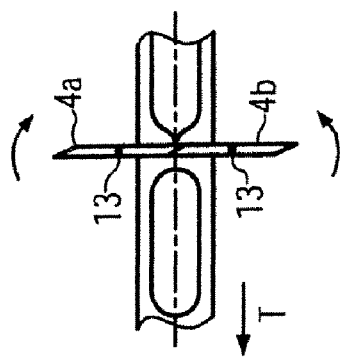
FIG. 5 schematically illustrates an alternative parting device to that shown in FIG. 4.

As shown in FIG. 5, the parting elements 4a, b are also formed such that they are rotated about an axis 13 for portioning. Here, the parting element 4a, for example, comprises two oppositely situated blades and the parting element 4b two oppositely situated opposing pieces. The opposing pieces act as opposing pieces for the blades during the cutting process.

Furthermore, the device has a control device 14 which controls the filling process. The controller is designed such that it controls the transport devices 2, 3, in particular their drives, such that the transport speeds of the first and second transport devices are intermittently different such that the portioning point 12 between two adjacently arranged sausages is increased.

Figure 3:
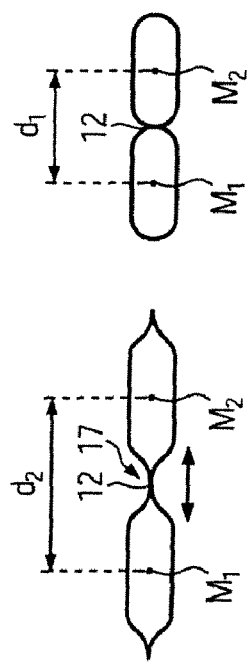
FIG. 3 schematically illustrates the sausages after and before the enlargement of the portioning point.

As can be seen particularly from FIG. 2, the sausages are situated closely adjacent in a sausage chain. As can be seen from FIG. 3, the centre points (central in relation to the length of the sausage) have a spacing d1 with respect to one another. Due to the fact that the second transport device 3 runs at least intermittently faster than the first transport device 2, the portioning point 12 between the two transport devices can be drawn out so that a gap 17 is created between the individual sausages 8. The spacing d2 between the centre points M1 and M2 is therefore larger than the spacing d1 before the enlargement. In particular the spacing d2 is 1 to 8 mm larger than the spacing d1. The speeds or the differential speed between the transport devices 2, 3 are set such that an appropriately large gap 17 can be created. Thus, the parting device 4a, b has sufficient space for parting the portioning point 12.

In particular with a high filling throughput it is advantageous if a sensor 15 is provided which can detect a portioning point 12. When the detector 15a, b detects a portioning point 12, it can send the output signal to a control unit of the controller 14, whereby the parting device 4a, b is controlled in dependence of this signal so that the parting elements 4a, b move towards one another exactly when the portioning point 12 is located at the parting point B. The sensor is arranged at a point S approximately in a region from 50 to 400 mm before the parting device 4a, b. A sensor of this nature can, for example, have two sensor elements 15a, b, which are arranged at the side on the transport device 3 at the height of the sausages to be transported. The sensor can, for example, be an infrared sensor with an infrared light source 15a and an oppositely situated infrared detector 15b. The sensor can however also be formed as a CCD camera or as a laser or a red-light sensor. The essential feature is that in the region S of the sensor a different signal is output from the sensor for a firmly filled sausage section than for the portioning point 12.

An appropriate sensor is however not an absolute necessity. The position of the portioning point can in addition or alternatively be determined by a unit of the controller 14 on the basis of known parameters, such as, for example, the point in time and location A at which the portioning point 12 is produced, transport speed of the transport device 2, transport speed of the transport device 3. Thus the controller can determine exactly when the portioning point 12 is located in the parting region B and then actuate the parting device 4a, b.

The controller 14 can also comprise a unit which can exactly determine when the portioning point 12 is located in a region B between the transport devices 2, 3. The control device 14 can determine this based on known parameters, such as the position A and point in time of the production of the portioning point, as well as the transport speed of the first transport device 2. Additionally, or alternatively, an appropriate sensor (not illustrated) can be provided, which, for example, is constructed as has been described in connection with the detector 15a, b. It is however also possible to determine the position of the portioning point 12 in the region B based on the signal from the sensor 15a, b.

Thus, when the portioning point 12 is located between the transport devices 2, 3, the transport speed of the first and/or second transport device can then be changed appropriately to enlarge the portioning point.

In the following the method according to the disclosure is explained in more detail with reference to FIGS. 1 to 5.

In a manner known per se the paste mass is pushed through the filling tube into a sausage skin. To produce a sausage chain a portioning point 12 is then produced in the region A between the end of the filling tube and the first transport device 2 by twisting.

It is however also possible to produce the portioning point 12 not by twisting, but rather, for example, by displacement of the paste mass and the placement of at least one clip (e.g. a metal clip) using a clip machine.

The sausage chain produced in this way is transported by the transport device 2 in the transport direction T, whereby at the end of the transport device 2 the sausages 8 are transferred to the transport device 3. Since the two transport devices 2, 3 are positioned close together, even short sausages can be easily transferred and do not drop down. The sausage chain is not held in the region B between the transport devices 2, 3. If the second transport device 3 now runs faster than the first transport device 2, the portioning point 12 is drawn out in this region and enlarged, as has been described previously in connection with FIG. 3. The speed difference between the transport devices 2, 3 is set such that the desired enlargement of the gap 17 is produced. To achieve this the transport device 3 can, for example, continuously run slightly faster than the transport device 2.

It is however also possible that the transport speed of the second transport device 3 is briefly increased and/or the transport speed of the first transport device 2 is briefly reduced. Advantageously, this then occurs when the portioning point 12 is located between the transport devices 2, 3, so that this point can be stretched. The speed difference and the length of the time period of the change of speed is set such that a gap of the desired size is produced. After the acceleration or retardation the transport devices 2, 3 can run again at their previous speeds, e.g. with the same speed. Here it may be advantageous if the point in time at which a portioning point 12 is located in the region B is determined either by computation or via a sensor.

The sausage chain with the enlarged portioning point 12 is then conveyed further in the transport direction T by the second transport device 3 until an enlarged portioning point 12 arrives at the parting point B. The point in time when a portioning point 12 arrives in the region B can either, as previously explained, be determined by the control device 14 based on known parameters or computed, and/or it can be determined via a sensor 15a, b at the point S.

Once it has been determined that a portioning point is located in the region B, the parting elements 4a, b of the parting device are actuated and part the sausage chain at the portioning point 12. The single sausages are transported further by the transport device 3 for further processing. The process is repeated for the following sausages and portioning points.

During partition of the sausage chain at the portioning point 12 the sausages are securely held by the transport device 3, i.e. by the oppositely situated belts, so that no displacement of the sausages occurs during partition. Also burst casings can be significantly reduced by the disclosure. The disclosure facilitates an increase in the filling speed and thus also in the effective throughput. During parting there are no collision points and clean parting and fault-free working are possible.

The invention claimed is:

1. Method of parting a sausage chain into single sausages, comprising:
   transporting the filled, portioned sausages with a first transport device and with a second transport device arranged behind the first transport device in the transport direction T,
   enlarging and stretching the portioning point between two consecutively arranged sausages in that the transport speed of the second transport device is at least intermittently greater than the transport speed of the first transport device, and thereafter
   parting of the portioning point in the second transport device.

2. Method according to claim 1, and briefly increasing the transport speed of the second transport device and/or briefly reducing the transport speed of the first transport device.

3. Method according to claim 2, and briefly increasing the transport speed of the second transport device and/or briefly reducing the transport speed of the first transport device when a portioning point is located between the first and second transport devices.

4. Method according to claim 1, and enlarging the portioning point such that the spacing of the center points of consecutively located sausages is 1-8 mm larger than the spacing before the enlargement.

5. Method according to claim 1, and determining the position of the portioning point before the portioning point by means of a sensor.

6. Method according to claim 1, and determining when a portioning point is located between the first and second transport devices, and then appropriately changing the transport speed of the first and/or the second transport.

7. Device for implementing the method according to claim 1 comprising:
   a first transport device for the sausages,
   a second transport device arranged behind the first transport device in the transport direction T,
   a parting device (4a, b) for parting two consecutively arranged sausages at the portioning point, wherein the parting device is arranged in the second transport device and,
   a controller which controls the transport devices such that the transport speeds of the first and second transport devices are at least intermittently different, whereby the portioning point between two adjacently arranged sausages is enlarged and stretched.

8. Device according to claim 7, and a sensor, which can detect a portioning point, is arranged in a region (S) before the parting device.

9. Device according to claim 8, wherein the sensor is arranged in a region from 50 to 400 mm before the parting device.

10. Device according to claim 7, wherein the spacing between the two transport devices is in a range from 1 to 5 mm.

11. Device according to claim 7, controller briefly increases the speed of the second transport device and/or briefly reduces the speed of the first transport device.

12. Device according to claim 11, wherein the controller briefly increases the speed of the second transport device and/or briefly reduces the speed of the first transport device when a portioning point is located between the first and second transport devices.

13. Device according to claim 7, wherein the controller comprises a unit which determines when a portioning point is located between the first and second transport devices.

14. Device according to claim 1, wherein the first and second transport devices each comprise oppositely situated circulating transport means.

15. Device according to claim 14, wherein the oppositely situated circulating transport means comprise oppositely situated circulating belts.

\* \* \* \* \*